United States Patent [19]

Hawk

[11] 4,317,720
[45] Mar. 2, 1982

[54] CLEANING FLUID RECOVERY APPARATUS

[76] Inventor: Eugene D. Hawk, 2837 Manchester Ave., SW., Massillon, Ohio 44646

[21] Appl. No.: 188,543

[22] Filed: Sep. 18, 1980

[51] Int. Cl.³ .............................................. B03D 3/00
[52] U.S. Cl. ...................................... 210/86; 210/114; 210/247; 210/310; 210/312; 210/469
[58] Field of Search ............... 210/114, 116, 244, 247, 210/248, 298, 303, 310, 312, 469, 475, 86

[56] References Cited

U.S. PATENT DOCUMENTS

| | | | |
|---|---|---|---|
| 716,326 | 12/1902 | White et al. | 210/532.1 |
| 869,433 | 10/1907 | Hancock | 210/470 |
| 1,711,428 | 4/1929 | Schafer | 210/114 |
| 2,083,861 | 6/1937 | Padgett | 210/312 X |
| 2,250,646 | 7/1941 | Metsch | 210/475 |
| 2,683,534 | 7/1954 | Winkler . | |
| 2,782,929 | 2/1957 | Colket | 210/522 X |
| 3,707,404 | 12/1972 | Carlson et al. | 134/10 |
| 3,854,388 | 12/1974 | King | 55/118 X |

*Primary Examiner*—John Adee
*Attorney, Agent, or Firm*—Frease & Bishop

[57] ABSTRACT

Apparatus for recovering solvents used for cleaning machine parts and the like from the water used to wash the cleaning solvent from the parts. A fluid-receiving tank has a screen covering the open top of the tank for supporting a part to be cleaned. A splash guard projects above the screen on the back and sides of the tank. A shallow tray is slidably mounted on the tank beneath and closely adjacent to the screen for collecting sludge during a cleaning operation with the water and cleaning solvent overflowing the tray and collecting in the tank below. An inverted U-shaped drain pipe is mounted on the bottom wall of the tank with the inlet of the pipe located closely adjacent to the bottom wall within the tank and the outlet being located externally of the tank beneath the bottom tank wall. When the depth of liquid in the tank rises above the curved portion of the drain pipe, the water, which is heavier than the cleaning solvent, will flow through the drain pipe and out of the tank with the cleaning fluid remaining in the tank. A signal tube is mounted on the tank and has its inlet level a short distance above the curved portion of the drain pipe to collect solvent flowing through the tube in a receptacle for reuse while collecting the wash water flowing through the drain pipe in another receptacle.

9 Claims, 5 Drawing Figures

CLEANING FLUID RECOVERY APPARATUS

BACKGROUND OF THE INVENTION

1. Field of the Invention

The invention relates to fluid recovery apparatus and in particular to apparatus for separating a cleaning solvent from water. More particularly, the invention relates to an apparatus for separating cleaning fluid which has a lighter specific gravity than water automatically from the wash water which is used in the cleaning of equipment and parts on a cleaning table, eliminating solvent waste and environmental problems.

2. Description of the Prior Art

Problems have existed in garages, machine shops, tool shops and the like where the cleaning of parts is performed. The parts being cleaned usually are dipped in a solvent to dissolve and remove grease, grime, oil and other similar deposits from the part. The part, after being dipped or sprayed with the solvent, then is sprayed with a water wash to remove the solvent and remaining dirt particles from the part. This presents several problems. The solvent and residue left on the part are deposited on the floor, walls or other objects on which the cleaning is being performed. Heretofore the water, solvent and residue usually were flushed down an open drain, resulting in both loss of solvent and contamination of the water system, affecting the environment. Some shop owners would attempt to shortcut the wash procedure in order to save water and mess, thereby resulting in an improperly cleaned part.

Another problem is that when a fluid collection container or tank is used to recover this solvent and water, small parts will drop into the fluid collection tank, requiring the workman to manually search through the tank and sludge to recover the part. Such part recovery is messy, difficult and time consuming. Also, prior part cleaning areas and equipment require a drain nearby the disposal of the solvent-containing water and sludge, thereby limiting the locations in which the equipment can be installed.

Accordingly, the need has existed in the art for an apparatus which is economical, practical and durable for use in cleaning parts, which enables the wash water to be separated and removed automatically from the solvent prior to flushing the water down the drain. There is no known prior apparatus of which I am aware which accomplishes these results in as efficient and satisfactory a manner as my apparatus.

SUMMARY OF THE INVENTION

Objectives of the invention include providing a cleaning fluid recovery apparatus which eliminates the need for a drain for the discharge of the solvent containing fluid, thereby increasing the versatility of the apparatus and the areas in which it can be located; providing such an apparatus in which the part being cleaned is placed on a screen which is surrounded on three sides by splash guards so that the wash water is retained within the apparatus and not sprayed and splattered on adjacent walls and fixtures; providing such an apparatus in which a shallow tray is removably mounted beneath the screen for collecting the heavier sludge and dirt particles washed from the part by the wash water and which will catch any parts or components falling through the screen, preventing them from falling into the fluid reservoir, and in which the tray can be easily removed from the front of the apparatus for recovery of any such parts and for the easy removal of the sludge collected therein; providing such an apparatus which will help save the environment by containing nearly all of the cleaning solvents heretofore wasted and discharged into the water system, and in which the apparatus will automatically separate the solvent from the water upon the fluid reaching a predetermined level in the collection tank, whereby the water when discharged into a drain will not contain the harmful solvents which then can be recaptured for subsequent reuse or refinement; providing such an apparatus which is formed of rigid and durable sheet metal components that are assembled into a sturdy and rugged unit to provide continuous years of service with relatively little maintenance, and which can be made in various sizes and configurations to adapt to a particular installation and job site; providing such an apparatus which can be used easily for cleaning drain pans from vehicles containing large quantities of grease, oil and liquid without difficulty; providing such an apparatus having an inverted U-shaped drain pipe which automatically drains the water from the fluid collection tank while retaining the solvent in the tank for subsequent removal, and which can be equipped with a signal tube attached to the tank to indicate to an operator when the fluid level in the tank has reached the height at which the solvent may begin to overflow the front of the tank; and providing such an apparatus which substantially reduces cleaning costs, eliminates difficulties existing in the art, solves problems, satisfies needs, and obtains new results in the art.

These objectives and advantages are obtained by the improved cleaning fluid recovery apparatus of the invention, the general nature of which may be stated as including a tank having side, bottom front and back walls forming a container having an open top for receiving and holding a quantity of cleaning fluid and water in which the cleaning fluid has a lighter specific gravity than the water; a screen mounted on the tank adjacent the open top for supporting an article to be cleaned; tray means removably mounted on the tank below and closely adjacent to the screen; and an inverted, generally U-shaped drain pipe extending upwardly from the bottom wall of the tank, the drain pipe having inlet and outlet ends and an intermediate curved portion, the inlet end being located closely adjacent to the bottom wall of the tank within said tank and the outlet end being located beneath the bottom wall, whereby the water will flow out of the tank through the drain pipe upon the level of the liquid reaching the curved portion of the pipe with the cleaning fluid remaining in the tank in a layer on top of the water.

BRIEF DESCRIPTION OF THE DRAWINGS

A preferred embodiment of the invention—illustrative of the best mode in which applicant has contemplated applying the principle—is set forth in the following description and shown in the accompanying drawings, and is particularly and distinctly pointed out and set forth in the appended claims.

FIG. 5 is an enlarged fragmentary perspective view with portions broken away and in section of the rear righthand corner of the apparatus as shown in FIG. 1.

Similar numerals refer to similar parts throughout the drawings.

DESCRIPTION OF THE PREFERRED EMBODIMENT

Figure 1:
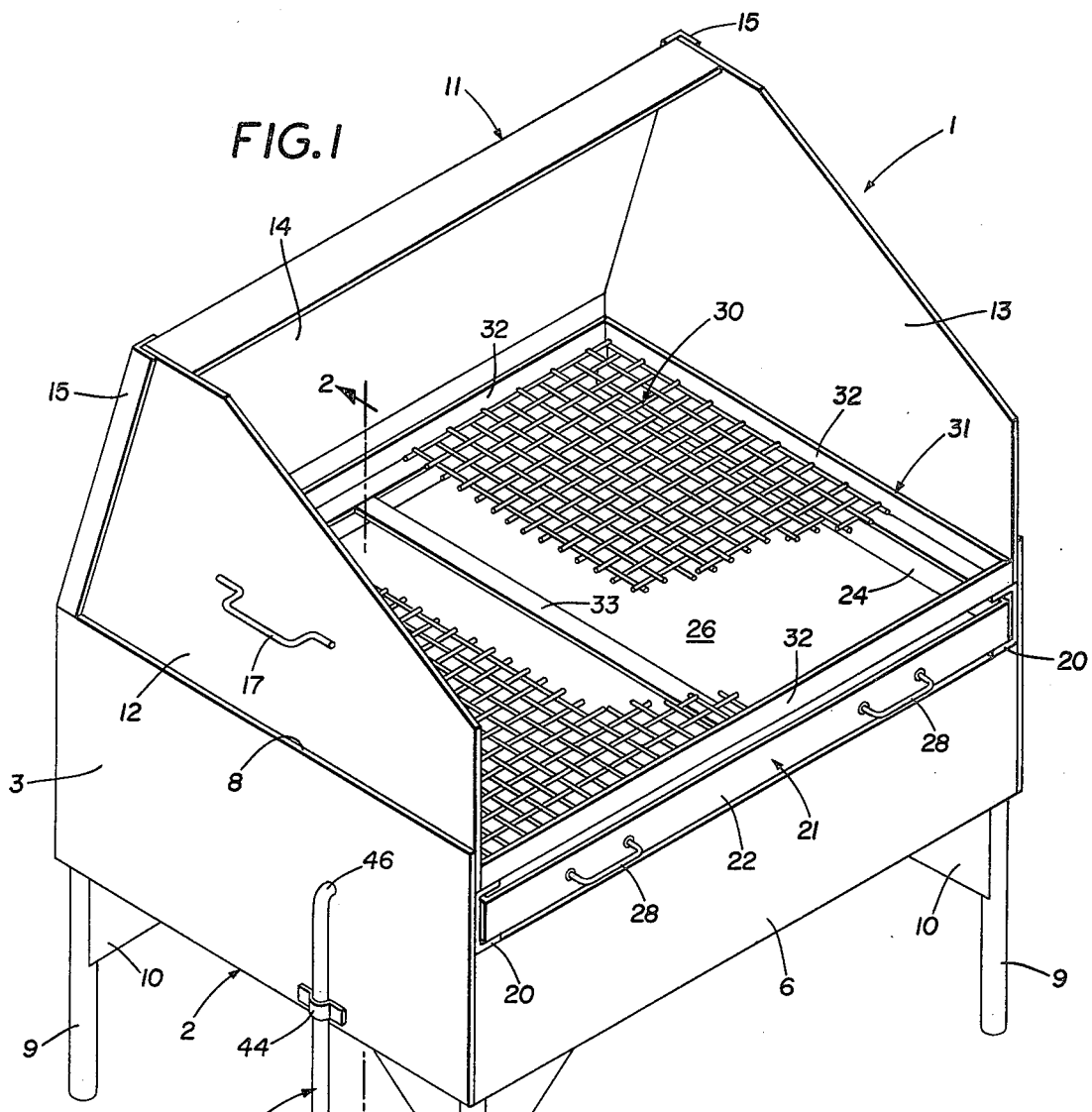
FIG. 1 is a perspective view of the improved cleaning fluid recovery apparatus with parts broken away.

The improved cleaning fluid recovery apparatus is indicated generally at 1, and is shown perspectively in FIG. 1. Apparatus 1 includes a rectangular-shaped tank 2 formed by a pair of spaced parallel side walls 3 and 4, parallel-spaced back and front walls 5 and 6, and a bottom wall 7, forming a fluid-receiving container 16 therebetween having an open top 8. Walls 3–7 preferably are formed of sheet metal plates of various thickness and are welded into a sturdy and durable unit. Tank 2 is supported by a plurality of corner leg posts 9 having reinforcing plates 10 extending between legs 9 and bottom wall 7.

A splash guard, indicated generally at 11, is mounted on tank 2 and extends about three sides of the tank. Splash guard 11 includes a pair of side plates 12 and 13 which are attached to side walls 3 and 4, respectively, and extend upwardly therefrom, and a back plate 14 which is mounted on and extends upwardly from back tank wall 5. Splash plates 12 and 13 are connected to back plate 14 by a pair of corner brackets 15. Splash plates 12, 13 and 14 may be permanently attached or removably mounted on their respective side and back walls without affecting the concept of the invention. Handles 17 are attached to splash plates 12 and 13 for removing splash guard 11 from the top of tank 2 when splash guard 11 is removably mounted thereon to facilitate cleaning of apparatus 1.

Figure 2:
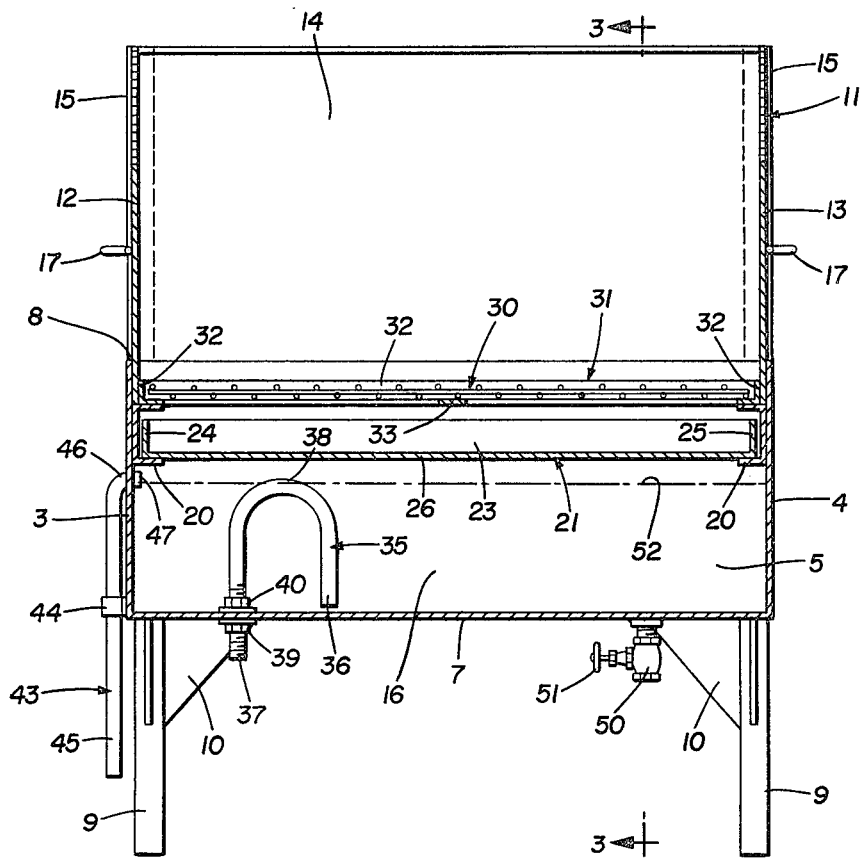
FIG. 2 is a sectional view taken on line 2—2, FIG. 1.
Figure 4:
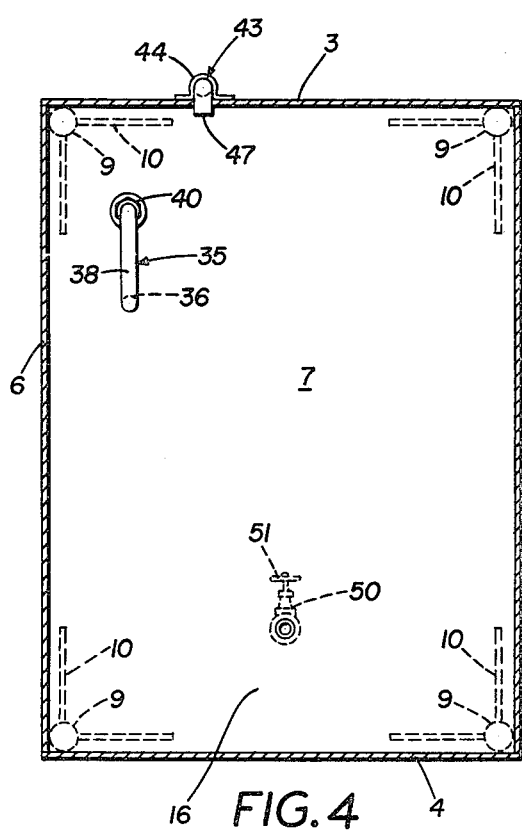
FIG. 4 is a horizontal sectional view taken on line 4—4, FIG. 3.
Figure 3:
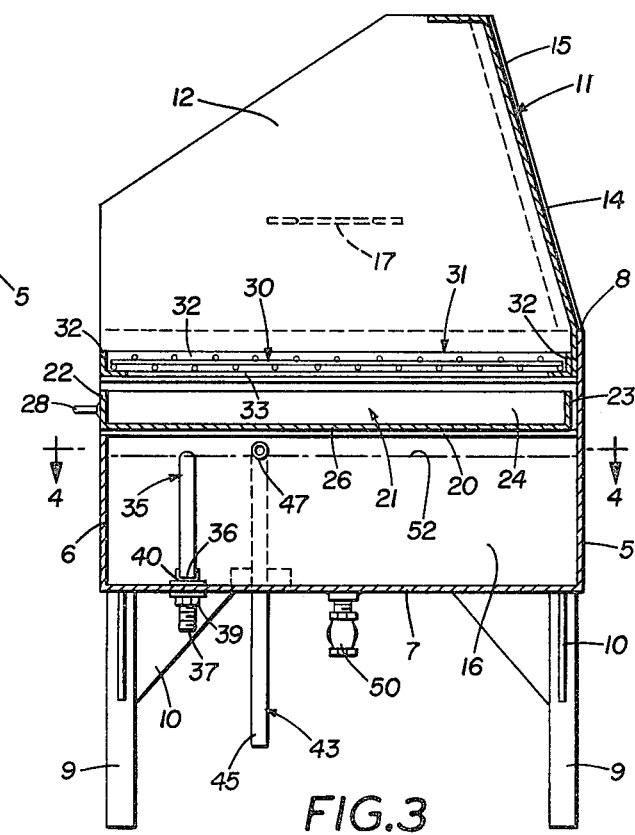
FIG. 3 is a vertical sectional view taken on line 3—3, FIG. 2.

A pair of U-shaped channels 20 is welded to the inside surface of side walls 3 and 4 a short distance below the top edges of the side walls. Channels 20 extend between back wall 5 and front wall 6 in a generally horizontal position (FIGS. 2 and 3). In accordance with one of the features of the invention, a relatively shallow tray, indicated generally at 21, is slidably mounted on channels 20 for removably mounting tray 21 on the upper portion of tank 2. Tray 21 has a rectangular configuration formed by front and back walls 22 and 23, side walls 24 and 25, and a bottom wall 26. A pair of handles 28 is mounted on front tray wall 22 to facilitate the placement and removal of tray 21 on channels 20. Channels 20 may be sloped slightly rearwardly a few degrees so that the fluid which collects in tray 21 will overflow back tray wall 23 and into fluid-receiving container 16.

In accordance with another feature of the invention, a rigid metal screen, indicated generally at 30, is removably mounted on and extends over open top 8 of container 16. Screen 30 is supported on a rectangular-shaped frame 31 formed by four L-shaped angle brackets 32 which are welded on the lower portion of splash plates 12, 13 and 14. A center reinforcing metal strip 33 extends horizontally between the front and rear angle brackets 32 for supporting the center portion of screen 30. Screen 30 is formed of sufficiently stiff strands of wire or metal strips to enable it to support large parts and pieces of equipment being cleaned without excessive sag. Tray 21 is located beneath screen 30 and relatively closely adjacent to the bottom thereof, as shown in FIGS. 2 and 3.

In accordance with another feature of the invention, an inverted, generally U-shaped drain pipe 35 is mounted within container 16. Drain pipe 35 includes an inlet end 36 and an outlet end 37 integrally connected by an intermediate curved portion 38. Preferably, a short section of outlet end 37 is threaded and extends through an opening formed in bottom tank wall 7 and is mounted thereon by a pair of sealing flange nuts 39 and 40. The top of curved portion 38 of pipe 35 is located just beneath bottom wall 26 of tray 21.

A signal tube 43 is mounted on side tank wall 3 by a bracket 44 to provide a signal upon the fluid in container 16 reaching the level at which the solvent may begin to overflow the container. Tube 43 preferably consists of a straight section 45 and a curved top inlet section 46 which extends through an opening formed in side wall 3. Inlet end opening 47 of tube 43 is at a higher level above bottom tank wall 7 than curved portion 38 of drain pipe 35. If desired, signal tube 43 can be located in container 16 and extend upwardly through bottom wall 7 with inlet end opening 47 terminating at the same relative height above bottom wall 7 as when extending through side wall 3, as shown in the drawings, without affecting its operation.

A manually operated drain valve 50 is mounted on bottom wall 7 of tank 2 and communicates with the interior of container 16 for emptying the contents of the container by operation of valve wheel 51.

The operation of improved cleaning fluid recovery apparatus 1 is described briefly below. A part being cleaned may be dipped in a solvent tank (not shown) for removal of much of the dirt and sludge therefrom before placing it on screen 30 for washing by a water hose or the like. If desired, the part can be placed on screen 30 and the solvent sprayed on the part while on on the screen followed by the water wash.

Ultimately the part is washed with water from a high-pressure hose which removes the solvent and remaining dirt residue from the part. The solvent, water, sludge, dirt particles, etc. will flow through the openings of screen 30 and into tray 21. The large dirt particles and sludge will settle to the bottom of the fluid in tray 21. The cleaning fluid and water will overflow back wall 23 of tray 21 when the tray becomes filled with the collected fluid. The overflow fluid will be collected in container 16 which has a considerably greater storage capacity than that of tray 21. Splash guard 11 will prevent or greatly reduce the solvent, water and dirt from being splashed onto the surrounding building walls and work area when the wash water is applied to the part. The fluid which is splashed against the splash guard walls ultimately will flow down the walls and into tray 21 and subsequently container 16. Splashing is unavoidable due to the high pressure water wash which is applied to the part being cleaned. However, splash guard 11 eliminates much of the mess and problems heretofore incurred during a part-cleaning operation.

Occasionally during the cleaning of a part, components of the part or the part itself, if sufficiently small, will fall through the openings in screen 30. Heretofore, these components and parts would drop into the main fluid collection container, requiring the operator to grope through an appreciable depth of fluid and sludge to retrieve the part. In apparatus 1, tray 21 is merely slid outwardly along channels 20 from its normal operating position, enabling the part to be retrieved easily from the relatively shallow depth of the tray.

The solvent and was water will continue to overflow tray 21 and collect in container 16 with the solvent, due to its lighter specific gravity, collecting as a layer on top of the water. This solvent/water liquid will continue to rise in container 16 until the top of the solvent layer, indicated by dot-dash line 52 (FIGS. 2 and 3), reaches inlet end openings 47 of signal tube 43. At this level, the solvent will begin trickling through signal tube 43, indicating that the liquid level is near the top of the container and that the wash will begin to flow shortly through drain pipe 35. A collection receptacle can be placed beneath signal tube 43 to collect the solvent as it continues to trickle through the signal tube with the wash water being collected in another container located beneath drain pipe outlet 37.

U-shaped tube 35 will begin discharging water through outlet end 37 as the liquid level reaches the inside radius of curved pipe portion 38. Only water will flow through pipe 35 except for a very small initial amount of solvent, due to the inlet end of pipe 35 being located adjacent the bottom of container 16, since the lighter solvent is in a layer on top of the water. Thus, as more water and solvent enter container 16, water will continue to flow through pipe 35 with the solvent flowing through tube 43 until the thickness of the sludge on the bottom of the tank appreciably affects the flow of water through inlet end 36. It has been found that the sludge layer can extend an appreciable distance above inlet end 36 of pipe 35 without seriously affecting the flow of water therethrough.

Upon the solvent nearly filling container 16, valve 50 may be opened and the solvent, dirt particles, sludge and small amount of remaining water can be drained into a collection receptacle for reuse or refinement. After several reuses of the solvent, it may become too dirty for economical recycling or refinement and then can be burned as fuel or disposed of properly without being flushed into a water drainage system, as occurs in prior part cleaning units wherein the water and solvent are discharged together from the tank.

Signal tube 43 is not necessary for the satisfactory operation of improved apparatus 1 but is an auxiliary feature which enhances the operation and results obtained by apparatus 1.

The improved cleaning fluid recovery apparatus has a number of advantages over prior part-cleaning units. Since apparatus 1 requires no drain for its satisfactory operation, it can be installed at numerous locations in a garage or shop. The splash guards maintain the cleaning area in a cleaner condition than heretofore possible with prior units. Apparatus 1 is an extremely rugged and durable piece of equipment formed of rigid, readily available sheet metal components providing a relatively maintenance-free unit which enables the solvent to be separated automatically from the wash water for reuse. This saves both money and the environment since the separated solvent can be destroyed in an ecologically acceptable manner. The main and most important advantage of improved apparatus 1 is the beneficial effect on the environment and preservation and cleanliness of the water supply.

It is readily seen that the above-described apparatus can be used for separating other liquids than a cleaning solvent and water as long as the liquids have different specific gravities. For instance, in many vehicle repair shops and garages, pans filled with oil, sludge and grime are extremely difficult to clean and dispose of. This task can be performed easily with apparatus 1 in that the oil, sludge, etc. can be dumped onto screen 30 and the pan cleaned with a solvent and/or water thereon. The solvent and oil will rise to the top of the liquid in container 16 and the sludge will collect mainly in tray 21. The water is subsequently drained from container 16 through pipe 35 in the manner described above.

Accordingly, the construction is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved cleaning fluid recovery apparatus is constructed and used, the characteristics of the construction, and the advantageous, new and useful results obtained; the new and useful structures, devices, elements, arrangements, parts, and combinations, are set forth in the appended claims.

I claim:

1. Cleaning fluid recovery apparatus including:
   (a) a tank having side, bottom, front and back walls forming a container having an open top for receiving and holding a quantity of cleaning fluid and water in which the cleaning fluid has a lighter specific gravity than the water thereby forming a layer of cleaning fluid on top of the water;
   (b) a screen mounted on the tank adjacent the open top of the container for supporting an article to be cleaned;
   (c) a tray removably mounted on the tank below and closely adjacent to the screen, said tray having an imperforate bottom wall for the collection and retention of dirt and sludge removed from an article being cleaned; and
   (d) an inverted generally U-shaped drain pipe extending upwardly from the bottom wall of the container, said drain pipe having inlet and outlet ends and an intermediate curved portion, said inlet end being located closely adjacent to the bottom wall of the container within said container and the outlet end being located beneath said bottom wall, whereby the water will start to flow out of the container through the outlet end of the drain pipe upon the level of the water reaching an inside radius of the curved portion of the pipe with the cleaning fluid remaining in the tank in a layer on top of the water, with additional amounts of water flowing out of the drain pipe in direct relationship to additional amounts of water flowing into the container during subsequent cleaning operations.

2. The apparatus defined in claim 1 in which a signal tube having inlet and outlet ends is mounted on the tank with said inlet end communicating with the interior of the container and being positioned at a higher level above the bottom tank wall than the curved portion of the drain pipe; and in which the outlet end of the tube is located externally of the container whereby solvent will flow through said signal tube upon the fluid in the tank reaching a predetermined level in the container.

3. The apparatus defined in claim 1 in which an auxiliary, manually operated drain valve is mounted on the bottom wall of the container for draining liquid from the container.

4. The apparatus defined in claim 1 in which channel means is mounted on certain of the tank walls for slidably supporting the tray means on the tank.

5. The apparatus defined in claim 4 in which the channel means includes a pair of channels mounted on the side walls and extending between the back and front walls; and in which the tray means is removable from the front of the tank.

6. The apparatus defined in claim 5 in which the channels are sloped toward the back wall of the tank whereby the tray means is in a sloping position when mounted on the channels whereby the fluid collected in said tray means will overflow the tray means adjacent the back tank wall and into the container.

7. The apparatus defined in claim 1 in which the depth of the tray means is considerably less than the depth of the fluid-receiving container.

8. The apparatus defined in claim 1 in which splash guards are mounted on the tank and extend along and upwardly from the back and side walls of the container.

9. The apparatus defined in claim 1 in which bracket means is mounted on the tank and extends along certain of the container walls adjacent the open top of the container for removably supporting the screen on the tank.

* * * * *